United States Patent
Smith

(10) Patent No.: US 9,656,698 B2
(45) Date of Patent: May 23, 2017

(54) MOVEABLE CAB FAIRINGS

(71) Applicant: Firestone Industrial Products Company, LLC, Indianapolis, IN (US)

(72) Inventor: Jason B. Smith, Avon, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/706,582

(22) Filed: May 7, 2015

(65) Prior Publication Data
US 2015/0321706 A1    Nov. 12, 2015

Related U.S. Application Data

(60) Provisional application No. 61/989,853, filed on May 7, 2014.

(51) Int. Cl.
*B60J 9/00* (2006.01)
*B62D 35/00* (2006.01)
*B62D 33/06* (2006.01)
*B62D 27/00* (2006.01)
*B62D 37/02* (2006.01)

(52) U.S. Cl.
CPC ........... *B62D 35/001* (2013.01); *B62D 27/00* (2013.01); *B62D 33/06* (2013.01); *B62D 37/02* (2013.01)

(58) Field of Classification Search
CPC ...... B62D 35/001; B62D 35/00; B62D 35/02; B62D 37/02; B62D 35/004; B62D 63/08; B64C 7/00; F01N 3/2066

USPC ............ 296/180.2, 180.1, 180.3, 180.5, 37.6
See application file for complete search history.

(56) References Cited

U.S. PATENT DOCUMENTS

| | | | | |
|---|---|---|---|---|
| 3,834,752 A * | 9/1974 | Cook | .................... | B62D 35/004 105/1.1 |
| 4,056,279 A * | 11/1977 | Dorsch | ................ | B62D 35/001 105/1.2 |
| 4,343,506 A * | 8/1982 | Saltzman | ............. | B62D 35/001 105/1.2 |
| 4,518,188 A * | 5/1985 | Witten | ................. | B62D 35/001 105/1.1 |
| 4,611,796 A * | 9/1986 | Orr | .......................... | B60T 1/16 180/903 |
| 4,750,772 A * | 6/1988 | Haegert | ............... | B62D 35/001 296/180.2 |
| 4,775,179 A * | 10/1988 | Riggs | .................. | B62D 33/0612 296/180.2 |
| 5,078,448 A * | 1/1992 | Selzer et al. | ......... | B62D 35/001 105/1.2 |
| 5,685,597 A * | 11/1997 | Reid | .................... | B62D 35/002 248/202.1 |
| 6,099,069 A * | 8/2000 | Spears | ...................... | B60T 1/16 296/180.2 |
| 6,183,041 B1 * | 2/2001 | Wilson | ...................... | B60J 1/20 296/180.1 |

(Continued)

*Primary Examiner* — Kiran B Patel
(74) *Attorney, Agent, or Firm* — Taylor IP, P.C.

(57) ABSTRACT

A transport vehicle includes a cab; a trailer carried by the cab, the cab and the trailer forming a gap therebetween; and a fairing carried by the cab and at least partially covering the gap. The fairing includes at least one fairing panel; and a hinge connected to the at least one fairing panel and the cab or the trailer. The hinge allows the at least one fairing panel to switch between a first coverage state and a second coverage state.

7 Claims, 7 Drawing Sheets

(56) References Cited

U.S. PATENT DOCUMENTS

| | | | | |
|---|---|---|---|---|
| 6,267,434 B1* | 7/2001 | Casillas | B62D 35/001 | 296/180.1 |
| 6,428,084 B1* | 8/2002 | Liss | B62D 35/001 | 296/180.1 |
| 6,485,083 B1* | 11/2002 | Giannias | B60J 7/08 | 296/100.16 |
| 6,932,419 B1* | 8/2005 | McCullough | B62D 35/001 | 296/180.1 |
| 7,100,957 B1* | 9/2006 | Dangler | B60R 9/04 | 296/37.6 |
| 8,403,401 B2* | 3/2013 | Rinehart | B62D 35/001 | 296/180.3 |
| 8,419,109 B2* | 4/2013 | Pickering | B62D 35/001 | 296/180.2 |
| 8,506,004 B1* | 8/2013 | Vogel | B62D 35/001 | 296/180.1 |
| 2004/0075298 A1* | 4/2004 | Wong | B62D 35/001 | 296/180.2 |
| 2004/0239146 A1* | 12/2004 | Ortega | B62D 35/001 | 296/180.2 |
| 2005/0040668 A1* | 2/2005 | Wood | B62D 35/001 | 296/180.1 |
| 2007/0200390 A1* | 8/2007 | Lotarev | B62D 35/001 | 296/180.2 |
| 2008/0217957 A1* | 9/2008 | Schoon | B62D 35/001 | 296/180.4 |
| 2010/0072779 A1* | 3/2010 | Pfaff | B62D 35/001 | 296/180.2 |
| 2010/0194143 A1* | 8/2010 | Perkins | B62D 35/001 | 296/180.2 |
| 2011/0109121 A1* | 5/2011 | Salari | B62D 35/001 | 296/180.2 |
| 2012/0126573 A1* | 5/2012 | Minbiole | B62D 35/001 | 296/180.2 |
| 2013/0285348 A1* | 10/2013 | Schmitt | B62D 53/0814 | 280/438.1 |
| 2013/0297154 A1* | 11/2013 | Burchett | B62D 35/001 | 701/49 |
| 2014/0028049 A1* | 1/2014 | Vogel | B62D 35/001 | 296/180.2 |
| 2014/0137953 A1* | 5/2014 | Gibb | F17C 1/00 | 137/351 |
| 2014/0232133 A1* | 8/2014 | He | B62D 35/001 | 296/180.2 |
| 2014/0252798 A1* | 9/2014 | Angelo | B62D 33/0604 | 296/180.2 |
| 2014/0265434 A1* | 9/2014 | Nelson | B62D 35/001 | 296/180.2 |
| 2014/0319871 A1* | 10/2014 | Gan | B62D 35/001 | 296/180.2 |
| 2016/0059910 A1* | 3/2016 | Durand | B62D 35/02 | 296/180.4 |
| 2016/0139599 A1* | 5/2016 | Czlapinski | G05D 1/0212 | 701/41 |
| 2016/0194037 A1* | 7/2016 | Logounov | B62D 35/001 | 296/180.2 |

* cited by examiner

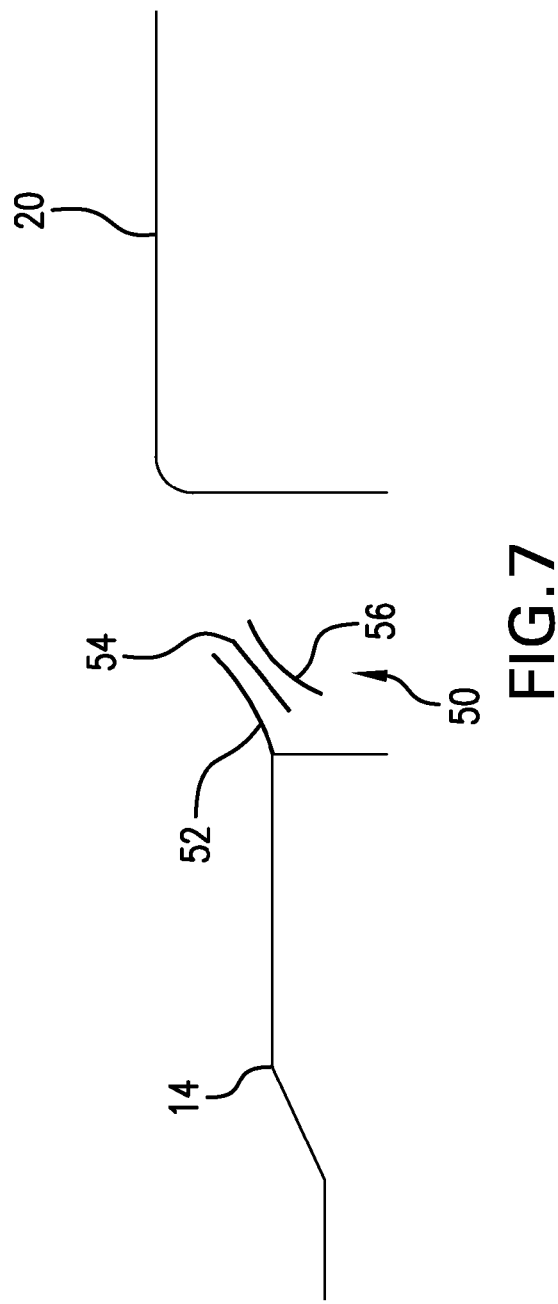
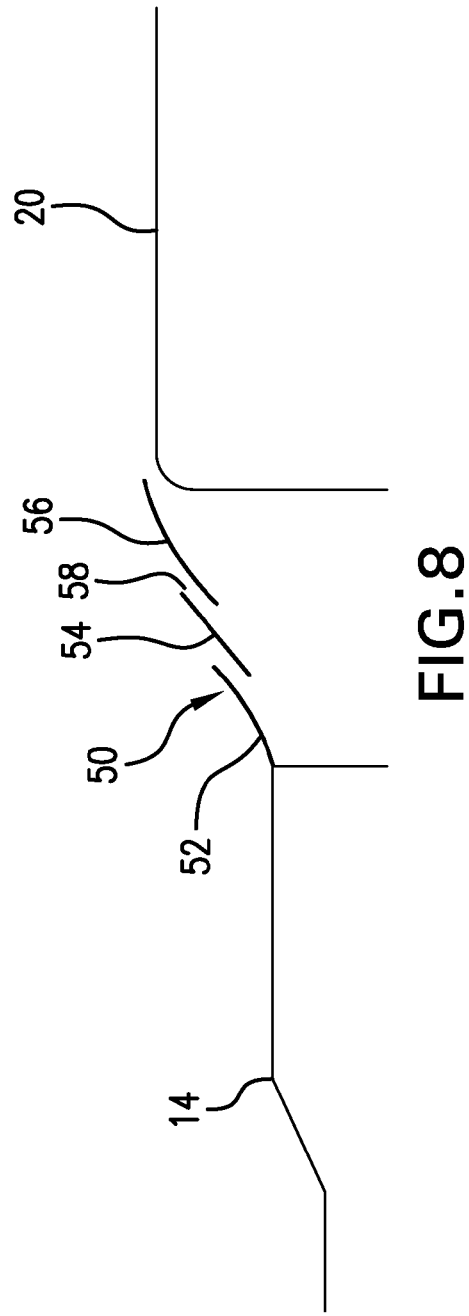
FIG. 7
FIG. 8

MOVEABLE CAB FAIRINGS

CROSS REFERENCE TO RELATED APPLICATIONS

This is a non-provisional application based upon U.S. provisional patent application Ser. No. 61/989,853, entitled "MOVEABLE CAB FAIRINGS", filed May 7, 2014, which is incorporated herein by reference.

BACKGROUND OF THE INVENTION

1. Field of the Invention

The present invention relates to fairings, and, more particularly, to cab fairings.

2. Description of the Related Art

When a truck cab is hauling a trailer, there can be a significant gap between the truck cab and the trailer. The gap between the truck cab and the trailer provides a surface for air resistance to form against, which increases fuel consumption and wear of the truck engine. Fairings are known that can be installed on the truck cab to cover some of the gap formed between the truck cab and trailer. The fairings are installed on the truck cab and extend toward the trailer, reducing the amount of air flow that can be directed against the trailer and create air resistance. The length of the fairings is less than the entire length of the gap, to prevent the fairings from interfering or being destroyed during a turning maneuver of the truck cab and the trailer. Such a length does not completely cover the gap and can still allow for air resistance to build between the truck cab and the hauled trailer.

What is needed in the art is a cab fairing that can reduce air resistance at high speeds.

SUMMARY OF THE INVENTION

The present invention provides a cab fairing that has moveable fairing panels.

The invention in one form is directed to a transport vehicle including a cab; a trailer carried by the cab, the cab and the trailer forming a gap therebetween; and a fairing carried by the cab and at least partially covering the gap. The fairing includes at least one fairing panel; and a hinge connected to the at least one fairing panel and the cab or the trailer, the hinge allowing the at least one fairing panel to switch between a first coverage state and a second coverage state.

The invention in another form is directed to a cab fairing including a fairing panel having an attachment end; a hinge connected to the attachment end that is configured to connect to a truck cab; and an actuator connected to the fairing panel that is configured to switch the fairing panel between a first coverage state and a second coverage state.

The invention in yet another form is directed to a cab fairing including a first fairing panel configured to attach to a truck cab; a second fairing panel moveably connected to the first fairing panel; and an actuator connected to the second fairing panel that is configured to move the second fairing panel relative to the first fairing panel.

An advantage of the present invention is that it allows for better coverage of the gap formed between a truck cab and a trailer, reducing the air resistance experienced at high speeds.

Another advantage is that the cab fairing can be configured to provide minimal interference with turning maneuvers of the truck cab and trailer.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 7 is a perspective view of yet another embodiment of a cab fairing according to the present invention in a low speed coverage state; and FIG. 8 is a perspective view of the embodiment shown in FIG. 7 in a cruising speed coverage state.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
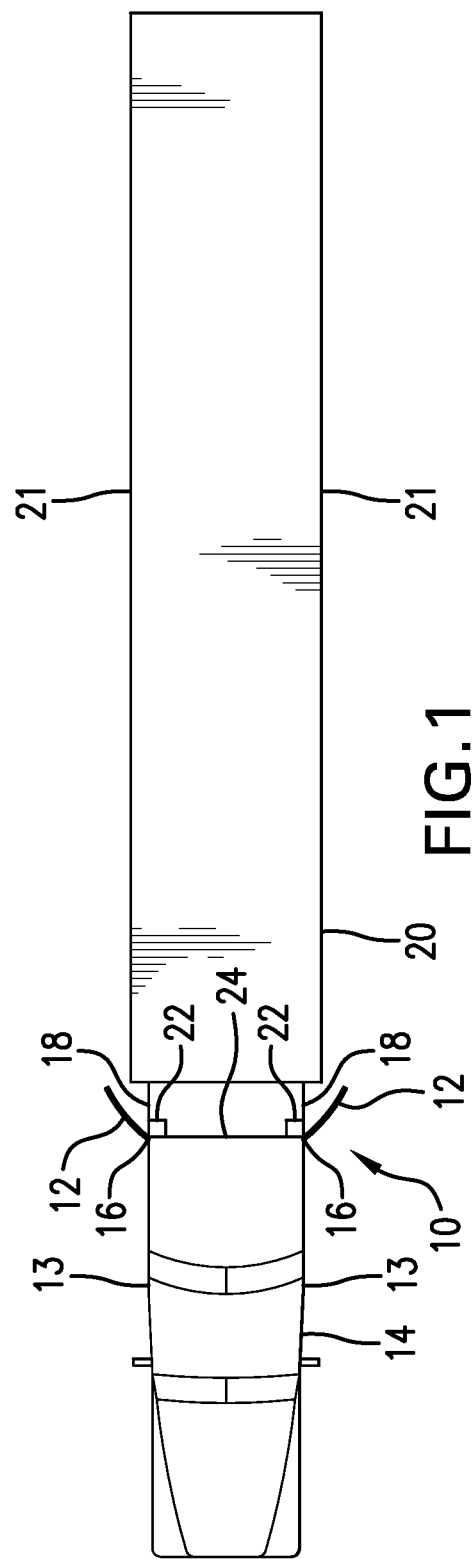
FIG. 1 is a perspective view of an embodiment of the present invention in a low speed coverage state.

Referring now to the drawings, and more particularly to FIG. 1, an embodiment of a cab fairing 10 of the present invention is shown that includes fairing panels 12 attached to a truck cab cab 14 of a transport vehicle 11 by hinges 16. Although the cab fairing 10 is shown as including a pair of fairing panels 12, one attached to each lateral side 13 of the truck cab 14, only one fairing panel 12 can be included in the cab fairing 10 if desired. The fairing panels 12 can be placed on lateral sides 13 of the truck cab 14 and extend past a gap 18 that is formed between the lateral sides 13 of the truck cab 14 and lateral sides 21 of a trailer 20 that the truck cab 14 is hauling. Alternatively, one or both of the fairing panels 12 can be attached to the trailer 20 or placed on a top side of the truck cab 14 or trailer 20. The fairing panels 12 can be sized and shaped to provide as much coverage of the gap 18 as desired. The fairing panels 12 can be formed as a shaped sheet of a polymeric or metal material to act as an air deflector while not adding substantial weight to the overall weight of the truck cab 14 and trailer 20. If desired, the fairing panels 12 can also be formed with vent holes (not shown) formed therein to allow some air entry into the gap 18 and help dissipate heat trapped between the truck cab 14 and trailer 20.

Figure 2:
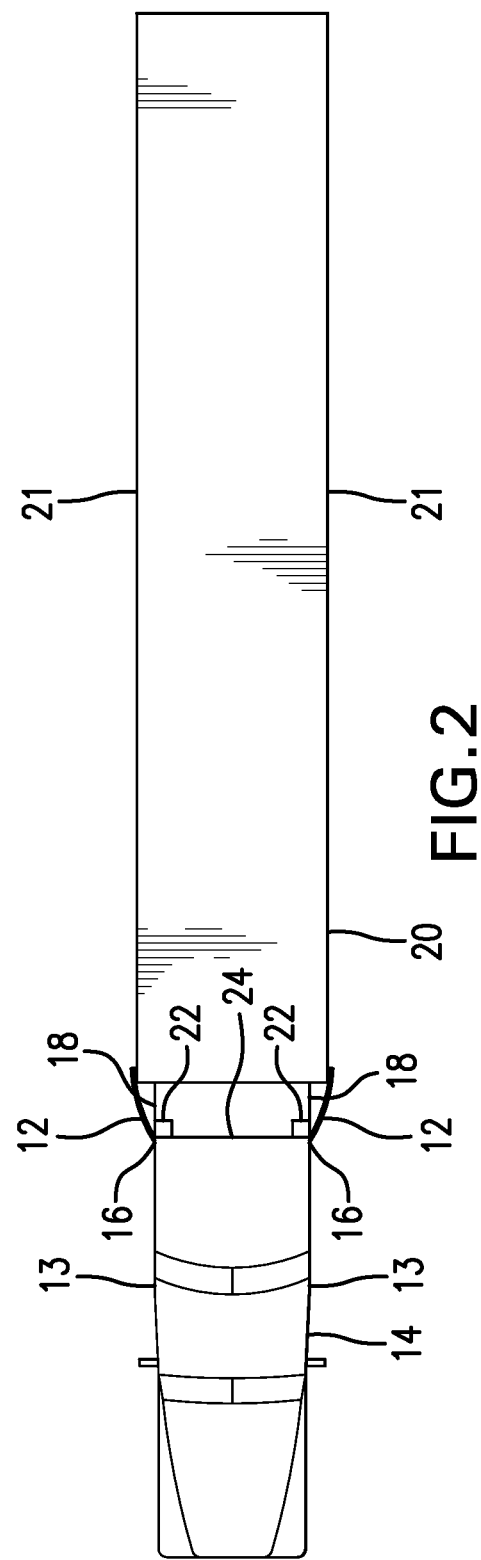
FIG. 2 is a perspective view of the embodiment shown in FIG. 1 in a cruising speed coverage state.

The cab fairing 10 is shown in a low speed coverage state in FIG. 1 and a cruising speed coverage state in FIG. 2. In the low speed state, the fairing panels 12 can be swung out relative to the truck cab 14 and trailer 20 so that they do not interfere with turning maneuvers of the truck cab 14 and trailer 20, which are more likely to be performed at low speeds. In other words, the fairing panels 12 can be swung out so that they do not contact both the truck cab 14 and the trailer 20 during relative turning between the truck cab 14 and trailer 20, which could cause damage to the cab fairing 10 if the fairing panels 12 were in the gap 18 during the turn or if the truck cab 14 or trailer 20 exerted force on the fairing panels 12 that stressed the hinges 16. In the cruising speed state, the fairing panels 12 can be held close to the trailer 20 to deflect air that would enter the gap 18 and push on the trailer 20, reducing the air resistance that the truck cab 14 and trailer 20 experience. The hinges 16 allow for the fairing panels 12 to swing away and toward the trailer 20. The hinges 16 can be configured so that the hinges 16 naturally bias the fairing panels 12 away from the trailer 20 at a resting degree relative to the trailer 20. At high enough speed, the air that hits the fairing panels 12 can push the fairing panels 12 toward the trailer 20, overcoming the bias forces that the hinges 16 exert on the fairing panels 12 to keep them away from the trailer 20. This allows for the fairing panels 12 to be put in the cruising speed state automatically without the need for additional components.

Optionally, the fairing panels 12 can be pushed into the low speed state or cruising speed state by one or more actuators 22. The actuators 22 can be attached to a back 24 of the truck cab 14 and push the fairing panels 12 outward to put them in the low speed state. The actuators 22 can be any type of actuator, such as an electrical or pneumatic actuator. In the low speed state, the actuators 22 can also help keep the fairing panels 12 pushed away from the truck cab 14 and trailer 20 to reduce the risk of interfering with turning maneuvers. The actuators 22 can be controlled such that they will automatically push the fairing panels 12 out during certain conditions, such as a low truck cab speed, or can be manually controlled by the truck cab's operator. Similarly, the actuators 22 can be controlled to retract the fairing panels 12 to cover the gap 18 automatically or manually. It should be appreciated that the actuator(s) 22 can be a passive element, such as a spring, that naturally biases the fairing panels 12 toward or away from the truck cab 14 and trailer 20 until sufficient air resistance against the fairing panels 12 is built up to push the fairing panels 12 in a direction opposite to the bias force exerted by the actuator(s) 22.

Figure 3:
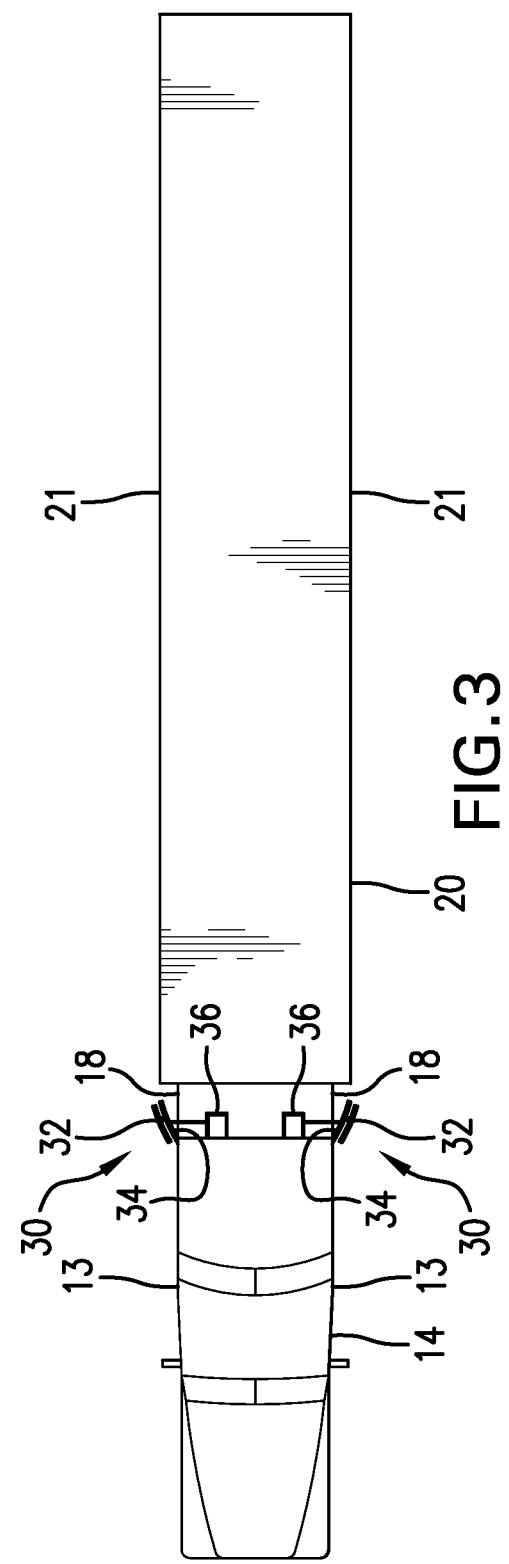
FIG. 3 is a perspective view of another embodiment of the present invention in a low speed coverage state.
Figure 4:
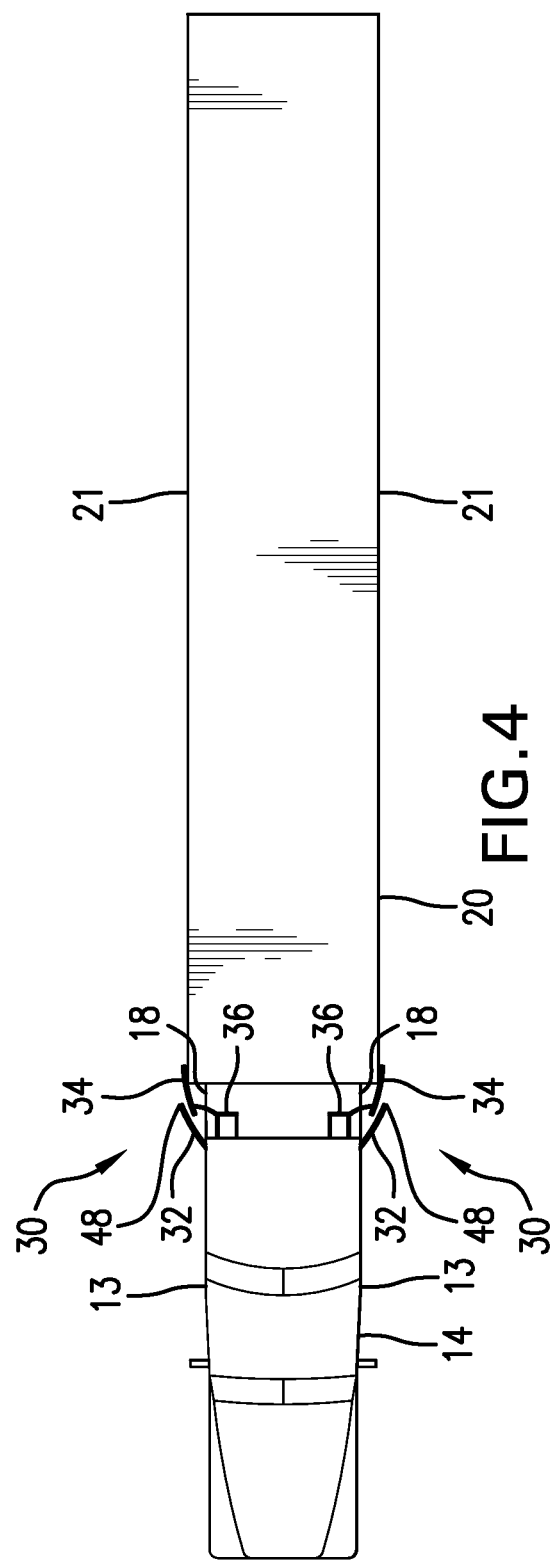
FIG. 4 is a perspective view of the embodiment shown in FIG. 3 in a cruising speed coverage state.

Referring now to FIGS. 3 and 4, a pair of cab fairings 30 are shown that include a first fairing panel 32 connected to a truck cab 14 and a second fairing panel 34 that is moveably connected to the first fairing panel 34. The truck cab 14 is connected to a trailer 20 with a gap 18 formed between the truck cab 14 and the trailer 20. For ease of explanation, remaining discussion of the cab fairings 30 will focus on a single cab fairing 30, but it should be understood that multiple cab fairings 30 can be installed on a truck cab 14 according to the present invention as shown in FIGS. 3 and 4.

As can be seen in FIG. 3, the cab fairing 30 is in a low speed coverage state. In the low speed coverage state, the first fairing panel 32 and second fairing panel 34 are retracted relative to the trailer 20 which allows for tight turning maneuvers to be performed without interference from the cab fairing 30. While the first fairing panel 32 is shown as being the outer fairing panel and the second fairing panel 34 is shown as being the inner fairing panel, the position of the fairing panels 32 and 34 could be reversed such that the first fairing panel 32 is the inner fairing panel, connected to truck cab 14, and the second fairing panel 34 is the outer fairing panel. The second fairing panel 34 can move along the first fairing panel 32, which will be described later, such that there is a complete overlap of the first fairing panel 32 and second fairing panel 34 in the low speed coverage state, or there could be a part of the second fairing panel 34 that does not overlap with the first fairing panel 32. The second fairing panel 34 can also optionally lock, manually or automatically, to the first fairing panel 32 to keep the cab fairing 30 in the low speed coverage state. The second fairing panel 34 can then be unlocked from the first fairing panel 32 to allow the cab fairing 30 to be switched into the cruising speed coverage state (shown in FIG. 4).

FIG. 4 shows the cab fairing 30 in the cruising speed coverage state, with the second fairing panel 34 being extended to cover a greater portion of the gap 18 than in the low speed coverage state. As can be seen, there is not a complete overlap of the first fairing panel 32 and second fairing panel 34 in the cruising speed coverage state. The second fairing panel 34 can be moved closer or farther relative to the truck cab 14 by any suitable method, such as by an actuator 36 connected to the second fairing panel 34 and either the first fairing panel 32 or the truck cab 14. The actuator 36 can be controlled similarly to the previously described actuators 22.

Figure 5:
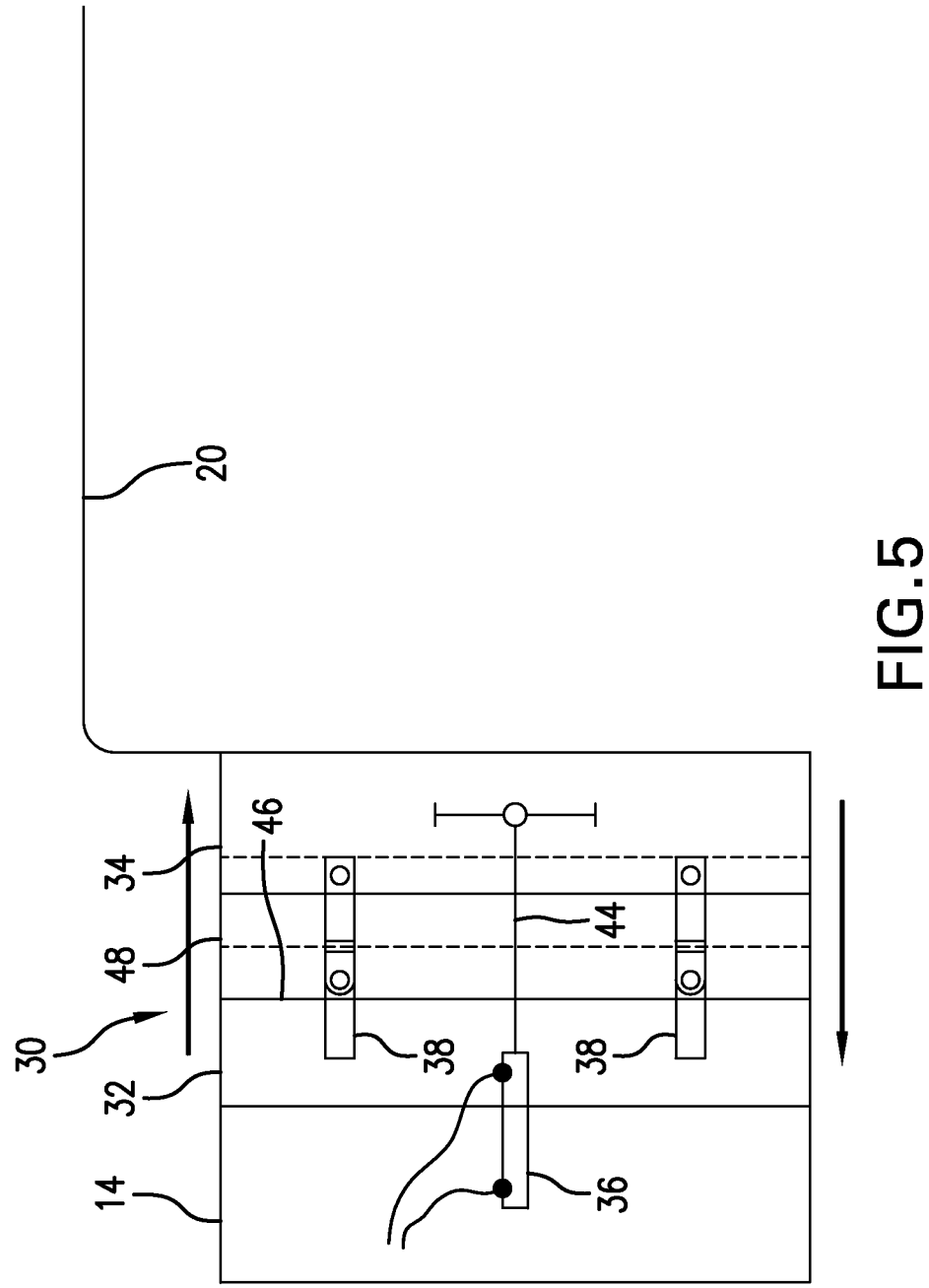
FIG. 5 is a perspective view of the embodiment shown in FIG. 3 during a switch from a low speed coverage state to a cruising speed coverage state.
Figure 6:
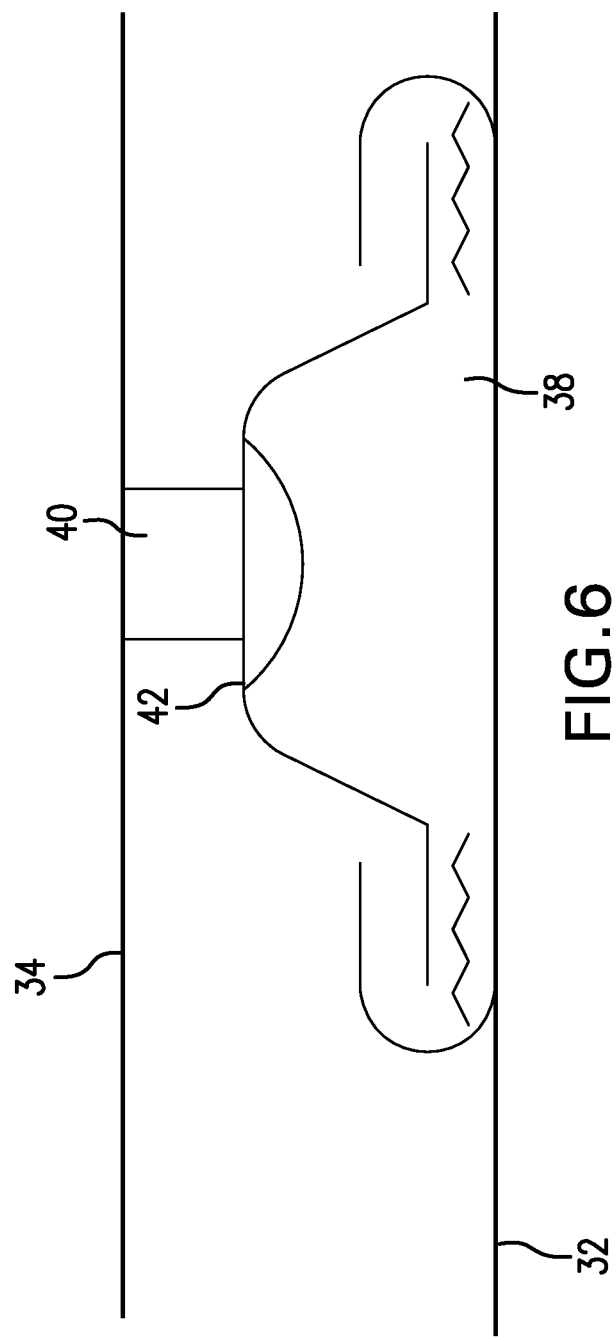
FIG. 6 is a close-up perspective view of an embodiment of a track and pin arrangement of the present invention.

FIG. 5 shows a side view of the previously described cab fairing 30 as the second fairing panel 34 is extending away from the first fairing panel 32. As can be seen, tracks 38 are installed on the first fairing panel 32 that hold pins 40 (shown in FIG. 6) that are attached to the second fairing panel 34. The tracks 38 have slots 42 formed therein that the pins 40 slide along to control movement of the second fairing panel 34 relative to the first fairing panel 32. When the actuator 36 is a pneumatic actuator, a piston rod 44 of the actuator 36 can be connected to the second fairing panel 34 and extend or retract the second fairing panel 34 relative to the first fairing panel 32. The tracks 38 can optionally extend out past an end 46 of the first fairing panel 32, allowing for a venting gap 48 to be formed between the first fairing panel 32 and the second fairing panel 34. A venting gap 48 can be a desirable inclusion due to heat buildup that can occur in the gap 18 from operation of the truck cab 14. The venting gap 48 allows for hot gases in the gap 18 to be pulled outside through the venting gap 48, reducing the temperature of the gap 18.

Referring now to FIGS. 7-8, an embodiment of a cab fairing 50 is shown that includes a first fairing panel 52 connected to the truck cab 14, a second fairing panel 54 connected to the first fairing panel 52 and a third fairing panel 56 connected to the second fairing panel 54. As shown in FIG. 7, the fairing panels 52, 54 and 56 can be in a low speed coverage state where the panels mostly overlap one another. The first fairing panel 52 can stay statically connected to the truck cab 14, or trailer 20 if desired, while the second fairing panel 54 and third fairing panel 56 can move relative to the first fairing panel 52. As can be seen in FIG. 8, the second fairing panel 54 can move relative to the first fairing panel 52 similarly to previously described moveable fairing panels 32 and 34 and the third fairing panel 56 can move relative to the second fairing panel 54 similarly as well to assume a cruising speed coverage state. The moveable second fairing panel 54 and/or third fairing panel 56 can be moved relative to other fairing panels by an actuator or other provided force, such as force caused by air resistance at a certain speed, either manually or automatically. The first fairing panel 52, second fairing panel 54 and third fairing panel 56 can also form venting gaps 58 between adjacent panels. While the cab fairings 30 and 50 shown in FIGS. 3-4 and 7-8 include two and three fairing panels, respectively, cab fairings can be designed with any number of moveable fairing panels according to the present invention.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A transport vehicle, comprising:
   a cab;
   a trailer carried by said cab, said cab and said trailer forming a gap therebetween; and
   a fairing carried by said cab and at least partially covering said gap, said fairing including a first fairing panel including a track with a slot formed therein and a second fairing panel including a pin which is slidably held within said slot, one of said first fairing panel and said second fairing panel being slidable relative to the other of said second fairing panel and said first fairing panel between a first coverage state and a second coverage state.

2. The transport vehicle according to claim 1, wherein said fairing is connected to a lateral side of said cab and said trailer has a lateral side, said lateral side of said cab and said lateral side of said trailer forming said gap therebetween.

3. The transport vehicle according to claim 2, wherein said fairing substantially covers said gap in said first coverage state.

4. The transport vehicle according to claim 3, wherein said fairing does not interfere with relative turning between said cab and said trailer in said second coverage state.

5. The transport vehicle according to claim 1, further comprising an actuator configured to slide one of said first fairing panel and said second fairing panel relative to the other of said second fairing panel and said first fairing panel.

6. The transport vehicle according to claim 1, wherein said first fairing panel and said second fairing panel substantially cover said gap in said first coverage state.

7. The transport vehicle according to claim 1, wherein said first fairing panel and said second fairing panel form a fairing gap therebetween.

* * * * *